May 30, 1950     O. T. BENDICSEN     2,509,285
ADJUSTABLE AND SELF-ALIGNING FITTING
Filed June 29, 1946     3 Sheets-Sheet 1
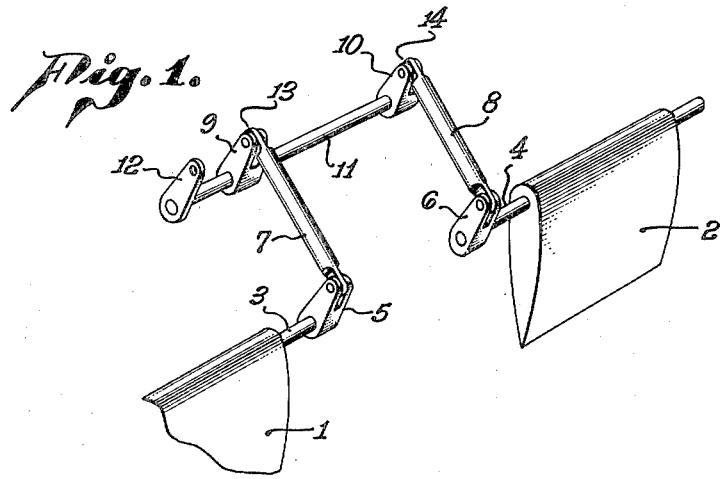
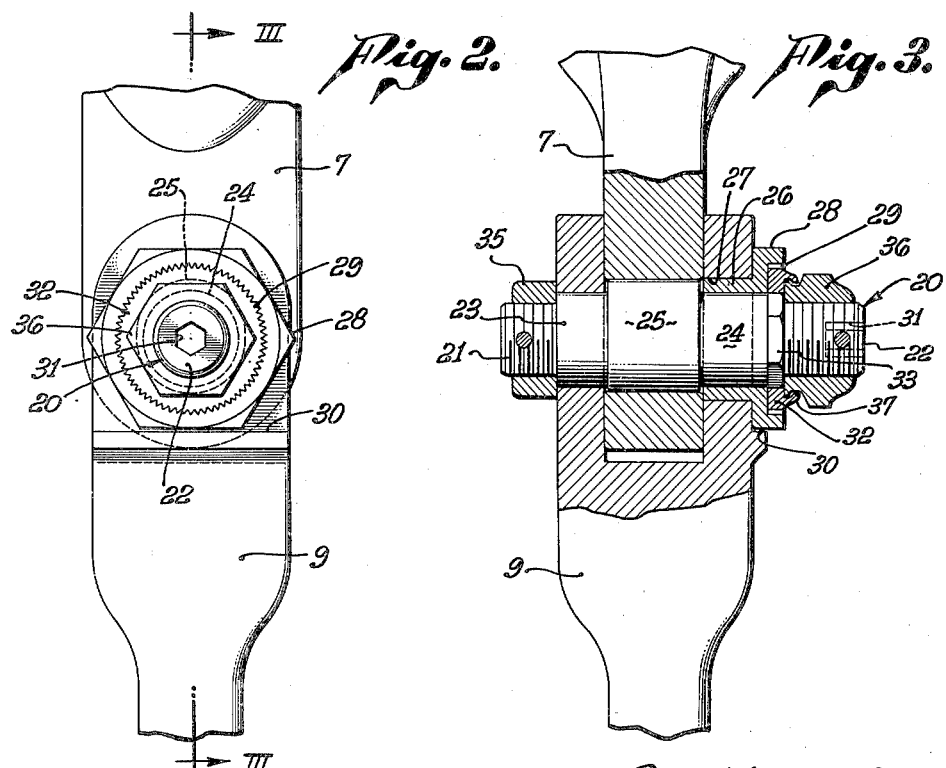
Olaf T. Bendicsen
INVENTOR
BY
ATTORNEY

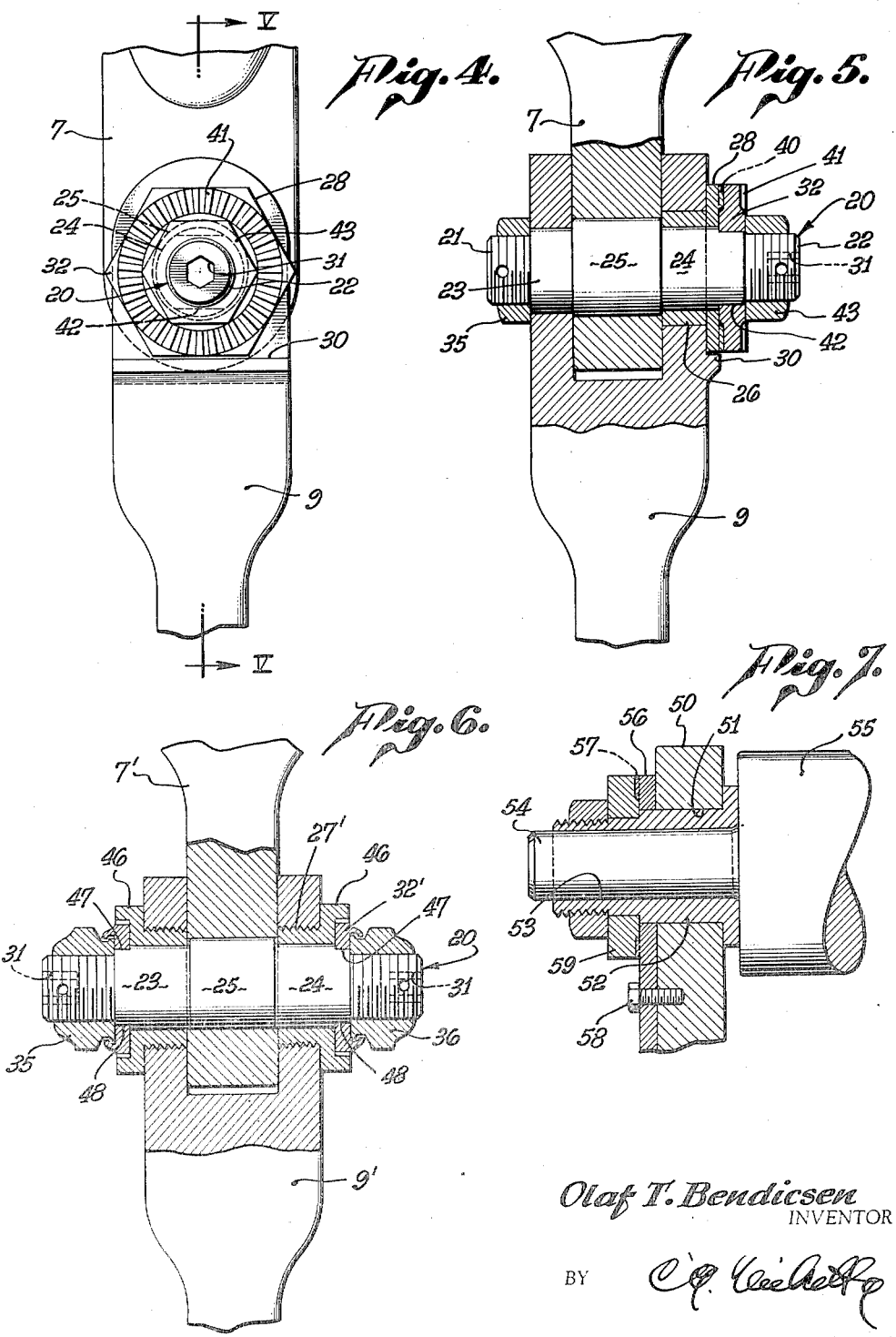

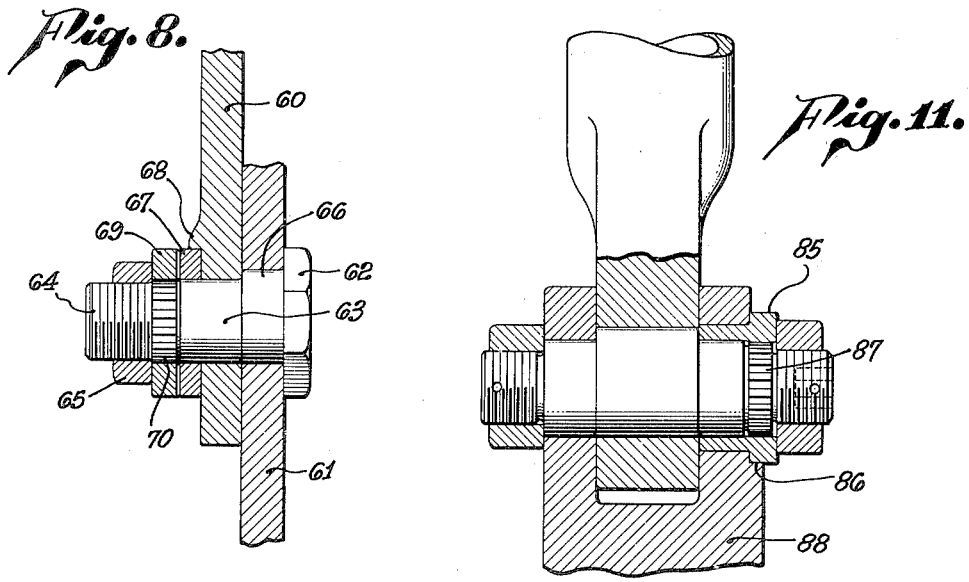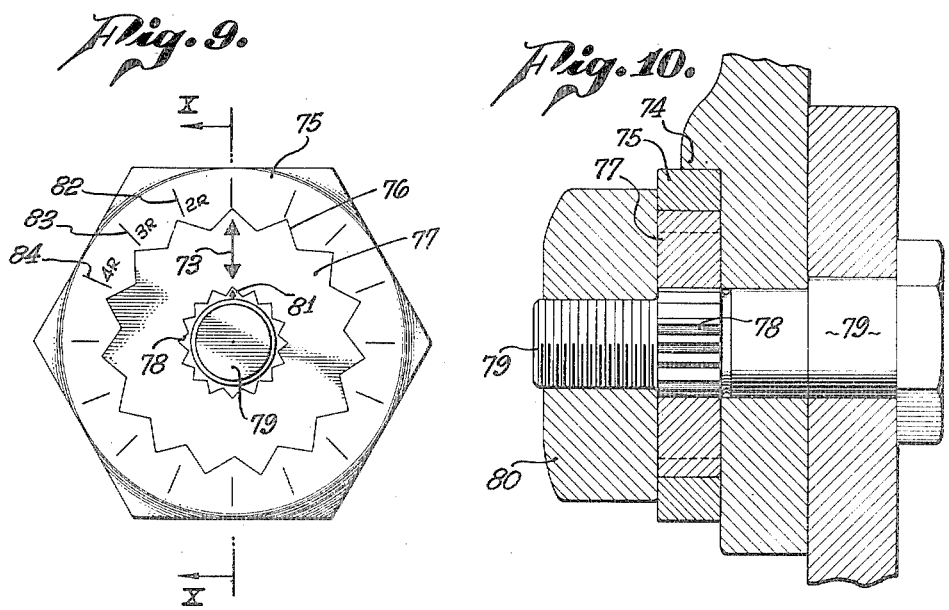

Patented May 30, 1950

2,509,285

UNITED STATES PATENT OFFICE 2,509,285

ADJUSTABLE AND SELF-ALIGNING FITTING

Olaf T. Bendicsen, Burbank, Calif.

Application June 29, 1946, Serial No. 680,339

12 Claims. (Cl. 287—100)

1

This invention relates to a fitting for connecting and adjustably positioning any two elements. The invention has a great many varied uses since the device may be employed in adjustably positioning any two or more elements with respect to each other, in a simple and efficient manner. It also may be employed in controllably adjusting and locating various devices with respect to a base or stationary or rigid object.

There are a great many instances wherein two elements must be connected and the position of one with respect to the other must be adjusted or controlled within very narrow limits. The present invention permits such elements to be adjustably connected and the position of one with respect to the other controlled with a great deal of accuracy by a device which not only acts as a connecting element but also as an aligning and adjusting element.

Generally stated, the device of the present invention consists of a bolt capable of extending through or connecting two separable elements. The bolt is preferably provided with an axial section and an eccentric section, the eccentric section being adapted to cooperate with a bore in one of the two elements which are being connected or adjustably positioned.

Means are provided whereby the bolt may be rotated or partially rotated to a predetermined and desired position so that the eccentric section is caused to move one of the elements with respect to the other and thereby place the elements in a desired relationship. Means are provided for locking the two elements together and to the bolt so that change in such relative position during operation of the machine or other device will not accidentally take place.

Means have also been provided in the device whereby the amount of rotation imparted to the bolt can be very accurately calibrated and regulated. Knowing the eccentricity of the eccentric section of the bolt with respect to the axial section, the amount of displacement of one element with respect to the other can therefore be very carefully and accurately controlled.

It is an object of the present invention, therefore, to disclose a simple and efficient adjustable fitting whereby two elements may be firmly connected and at the same time adjustably associated, one with respect to the other.

A further object of the invention is to disclose and provide an adjustable bolt including an axial section and an eccentric section and provided with means for positively and accurately controlling the position of the eccentric section.

2

These and other objects of the invention will become apparent to those skilled in the art from the following detailed description of certain exemplary forms of the invention and of manners in which the device may be employed.

In order to facilitate understanding, reference will be had to the appended drawings, in which:

Fig. 1 is a diagrammatic representation, somewhat in perspective form, indicating one adaptation of the fittings in aircraft construction.

Fig. 2 is an end view of one form of fitting shown in position between an upper element and a lower element such as a fork-shaped tie rod.

Fig. 3 is a section taken generally along the plane III—III of Fig. 2.

Fig. 4 is an end view of a modified form of adjustable fitting shown in association with two elements.

Fig. 5 is a longitudinal section taken along the plane V—V of Fig. 4.

Fig. 6 is a longitudinal section through a still further modification of the device.

Fig. 7 is a longitudinal section taken through a form of device modified for use with a trunnion or journal.

Fig. 8 is a longitudinal section through a modified form of device.

Figs. 9 and 10 are plan view and longitudinal section respectively through a form of device capable of locking the bolt in positions which require great accuracy.

Fig. 11 is a further modification showing a somewhat simplified structure.

The purpose of the fitting and its mode of operation may be best understood by first referring to Fig. 1 which diagrammatically illustrates a pair of wing flaps or dive flaps 1 and 2 of an aircraft. These wing flaps are mounted upon shafts 3 and 4 respectively, the shafts carrying arms 5 and 6 operated by links 7 and 8 connected to arms 9 and 10 mounted upon a counter-shaft 11. The counter-shaft 11 is rocked by a controllable force applied to the arm 12. In actual practice the arm 12 may be moved by hydraulic power or by means of cables operated by the pilot or co-pilot. In order to make certain that the two elements 1 and 2 move in synchrony and in perfect alignment, it may be necessary to adjust the length of throw of the links 7 and 8. Due to minor imperfections in manufacture or slight misalignment of the counter-shaft 11 with respect to the shafts 3 and 4, one of the links, such as 7, may have to be slightly longer than the link 8 in order to cause the dive flaps 1 and 2 to lie in exactly the same plane.

The adjustable fitting of the present invention can therefore be used with great advantage at the pivot points 13 and 14. The fitting of the present invention will not only connect the link 7 to the end of arm 9 but will also permit minor changes to be made in the length or form of the link 7 or link 8.

By referring to Figs. 2 and 3, the construction and operation of one form of adjustable fitting of this invention will become apparent. The fitting device may consist of a bolt, generally indicated at 20. The bolt shown in these two views is provided with threaded ends 21 and 22, concentric axial sections 23 and 24, and an intermediate eccentric section 25. The bolt is designed to extend through one element, such as 9, and another element such as 7. The concentric axial sections 23 and 24 should cooperate with the ends of the forked element 9 whereas the central eccentric section 25 should cooperate with a bore formed in the other element 7. An anchor means provided with a bore adapted to encircle the bolt is attached to one of the elements. In the embodiment shown in Figs. 2 and 3 the anchor means comprises a bushing 26 encircling the axial section 24 and received in an enlarged bore 27 in one arm of the fork of the element 9. The bushing 26 is provided with an enlarged end having the flange 28, the inner axial face of such flange being provided with a plurality of axial serrations 29. Bushing 26 and flange 28 may be separate parts or integral as shown.

The anchor means is connected to or engaged with the element 9 so as to be non-rotatable with respect to the element 9 in the following manner: the outer face of the flange 28 may be provided with one or a plurality of plane faces whereas the element 9 may be provided with a stop or flat 30 adapted to cooperate with one of such faces, as best shown in Fig. 2, wherein the outer surface of the flange 28 is shown to be in the form of a hexagon. The serrations 29 are arranged in a circle coaxial with the axis of the bolt 20.

One end of the bolt may be provided with a recess 31 capable of receiving a socket wrench. It will be evident that rotation of the bolt 20 will cause the eccentric 25 to shift the element 7 with respect to the element 9 since the eccentric section 25 is in sliding rotatable contact with the bore in element 7.

Means are provided for controlling the amount of rotation and accurately determining the angular shift of the bolt within the bores formed in the elements 7 and 9. Such means include the serrations 29 previously noted, and a lock plate adjustably engageable with the bolt 20 for rotation therewith. The lock plate is generally indicated at 32 and is provided with a hexagonal axial opening adapted to slide upon and engage the hexagonal section 33 of the bolt 20. The outer edge of the lock plate is provided with a multiplicity of serrations capable of engaging the serrations 29 of the anchor means.

Means are also provided for holding the bolt, lock plate and anchor in position in the elements. Such means may include either a fixed or removable nut 35 carried upon the threaded end 21 of the bolt and the nut 36 threadedly mounted upon the end 22 of the bolt. The nut 36 may have a rotatable connection with the lock plate 32 in the form of an outwardly extending flange on the bottom of the nut 36 and an inwardly extending interlocked flange 37 on the lock plate 32.

It will be evident that by loosening the nut 36 the lock plate 32 will be axially withdrawn along the hexagonal section 33 of the bolt so as to disengage from the serrations 29 of the anchor element. The anchor element is prevented from rotation by cooperation with the flat or stop 30. The bolt 20 can then be turned one or more notches of the serration 29 and the nut 36 then tightened, causing the lock plate 32 to engage with the anchor means, thereby firmly holding the bolt in its new, partially rotated position.

Preferably an even number of flats is formed on the anchor means 28 and an odd number of teeth or notches in the serrations 29. Moreover, the serrations 29 are preferably multitudinous so that the partial rotation of the bolt and its eccentric may be very accurately controlled. If, for example, there are seventy-two separate notches or teeth in the serrations 29, angular adjustments of 5° each may be imparted to the bolt 20.

It will be evident from the description given hereinabove that the use of an adjustable fitting of the character described at the positions 13 and 14 of Fig. 1 will permit accurate synchronization of the two flaps 1 and 2, the bolt simultaneously acting as pivot pin.

The modified version shown in Figs. 4 and 5 employs substantially the same elements and the same numbers will be used in describing the elements whenever possible, particular attention being drawn to the modifications.

The bolt 20 includes the coaxial sections 23 and 24 and the centrally disposed eccentric section 25. The anchor means is in the form of a bushing 26 provided with an enlarged end whose outer surface 28 is provided with one or more flats capable of cooperating with the fixed stop 30. Instead of using axial serrations the outer face of the anchor means is provided with a multiplicity of radial serrations, ribs or notches 40. Moreover, the lock plate 32 is shown provided with radial serrations on both faces, the serrations on the outer face of the lock plate 32 being indicated at 41. This lock plate 32 is provided with a central port having two parallel sides and curved ends as indicated in dash lines at 42 in Fig. 4, the two parallel flat sides cooperating with similar flats formed in the body of the bolt 20. A standard nut 43 is used for holding the bolt, lock plate and anchor means in locked position.

It will be evident that the lock plate 32 is axially movable whenever the nut 43 is loosened so that it may disengage the serrations 40. The bolt 20 may again be partially rotated by a suitable socket wrench inserted at 31 and the fitting tightened in a new position by tightening the nut 43.

By placing the radial serrations or notches 40 and 41 slightly out of phase with each other so that the serrations 40 are displaced with respect to the serrations 41 on the opposite face of the lock plate, a finer degree of adjustment may be attained. If, for example, we again have seventy-two radial serrations on each of the faces of lock plate 32 and the serrations 41 are displaced so as to be axially intermediate to serrations 40, then by removing the lock plate and causing the serrations 41 to engage with the serrations of the anchor means, 2½° of movement will be attained.

If the bolt 20 is provided with a fixed nut 35, it will be evident that the bolt may be turned by means of the nut 35 instead of the socket 31. Instead of the nut, a snap ring may be used and the end of the bolt provided with a socket wrench hole or a flatted end.

Various means may be employed in attaching the anchor means to one of the elements. It is not necessary that the anchor means be provided with a bushing section 26. The anchor means may, for example, comprise a ported plate attached to the face of the element 9 as by means of a screw, pin or rivet.

In Fig. 6 the bolt 20 is provided with adjustable means at both ends. The anchor means in this modification comprise an externally threaded member 46 cooperating with the internally threaded bores 27' of the element 9'. The lock plate 32' is shown provided with a central opening or port having a pair of parallel sides 47 and 48 cooperating with flats formed in the axial section 24 of the bolt 20. Each end of the bolt 20 is provided with a socket 31.

The construction described in this application may also be employed in adjustably positioning a roller or shaft. For example, by referring to Fig. 7, a standard or support 50 is shown provided with a bore 51. Journaled within this bore is a bushing or hollow bolt 52 provided with an eccentrically located bore 53 adapted to receive a shaft 54 or the pin of a roller 55. An anchor plate 56 provided with radial serrations 57 on one face is carried by the bushing 52 and prevented from rotation by a suitable lock or dog, as previously described.

In the specific embodiment shown, the anchor means 56 are held in position by means of a machine screw 58 extending through a tongue carried by the fixed support 50. The lock plate 59 is mounted upon suitable flats formed in the outer surface of the bushing 52 and is provided with serrations adapted to cooperate with the serrations 57 of the anchor means 56.

It is to be understood that the constructions described hereinbefore are applicable whenever two or more elements are connected together. It is not necessary that one of the elements be forked, as is the case with element 9 in the foregoing examples. Two single plates or plate-like elements may be associated by means of a device embodying the invention herein disclosed. Fig. 8 illustrates one form of such device and as there shown the elements 60 and 61, each provided with a bore, are adjustably connected together by means of a bolt provided with a head 62 concentric with a main body portion 63, the end of such body portion being externally threaded as at 64 so as to receive a locking nut 65. A portion of such bolt is provided with an eccentrically disposed section 66, this section being received within the bore of element 61 whereas the axial section 63 is received within the bore of element 60.

An anchor means is indicated at 67 and is prevented from rotation with respect to the bolt in any suitable manner as, for example, by having its outer surface or edge engaging with a locking shoulder 68. This anchor means is provided with radial serrations adapted to engage radial serrations carried by one face of a lock plate 69. The inner cylindrical surface of the lock plate 69 is provided with axially extending serrations capable of engaging with axial serrations 70 carried by a section of the bolt.

It will be evident from the construction illustrated that throw of the eccentric 66 may be readily positioned with respect to the axis of the bolt by simply locking the lock plate against the anchor means 67 in any desired relationship.

In some types of apparatus a bolt or fitting of this invention may be used to great advantage in moving an arm, lever, base, or other element into a desired position. By providing a fitting which will firmly hold the bolt in a multiplicity of positions differing from each other by but a very small angle of rotation, such as, for example, 1°, the arm, lever or element may be positioned with extreme accuracy. In order to attain such accuracy, a vernier relationship between an anchor member and a lock plate may be utilized. The radial serrations carried by the anchor means 67 may bear a predetermined relationship to the axial serrations 70. By employing a different number of serrations 70 than the radial serrations on the anchor means, intermediate positions may be attained. Such vernier adjustment is most readily attained when the number of cooperating serrations 70 differs from the number of radial serrations or multiple thereof and when the difference is numerically but 1.

Figs. 9 and 10 illustrate such relationship. For example, the anchor means 75 may be provided with six external flats adapted to cooperate with the stop 74 of one of the elements. This anchor member 75 may have a number of serrations 76 adapted to cooperatively engage serrations on the external surface of a locking ring 77. The locking ring in turn carries serrations adapted to cooperatively engage corresponding serrations 78 formed in the bolt 79. In the event there are fifteen serrations 76 and sixteen serrations 78, it will be evident that the bolt 79 may be held in a total of two hundred forty positions. One of the serrations 76 should be in alignment with one of the serrations 78 and such related or aligned serrations should be indicated by means of an index 73 scribed upon the surface of the locking ring 77. During adjustment or when it is desired to lock the bolt in a new position, the nut 80 is removed, the locking ring 77 is withdrawn, the bolt 79 is turned to its new position, and an indexing arrow or pointer 81, carried by the bolt, will point to angularly related scribe lines such as 82, 83, 84, and the like, formed on the surface of anchor member 75. These scribe lines may be suitably marked as 2R, 3R, 4R, as the case may be, so as to immediately notify the operator where to place the locking ring 77.

The markings carried by the scribe lines 82, 83, 84, etc., may refer to the number of teeth or serrations on the bolt to the right or left of the index 81 that the ring 77 should be moved, from a position where index 73 is in alignment with 81 in order to cause both sets of serrations 76 and 78 to properly interlock with the mating serrations on the locking ring 77.

It is not necessary that a separate anchor means and locking plate be employed. Fig. 11 permits vernier adjustment but accomplishes this in a somewhat simpler manner by employing an anchor bushing 85 provided with a polygonal head, the flats of the head cooperating with the shoulder 86 of one element so as to prevent rotation of the anchor bushing and at the same time permit selective positioning of various flats of the head against such stop 86. The bolt is provided with a series of serrations 87 adapted to cooperate with corresponding serrations on the internal surface of the bushing 85.

The anchor is therefore selectively attachable to one of the elements, such as element 88, in any one of a number of partially rotated positions, and when the number of said positions is different than the number of circumferentially arranged serrations 87, a vernier adjustment may be readily attained and the bolt locked in a great variety of positions. Preferably the number of the serrations 87 is materially larger than the number of alternate positions of the combined anchor and lock 85 or multiple thereof.

Those skilled in the art will readily appreciate that the fitting of the present invention permits adjustment for the cumulative manufacturing tolerances which generally give rise to appreciable difficulties when the parts of a mechanism are assembled. The fitting will adjust towards any desired position and the accuracy with which the adjustment is attained depends entirely upon the pitch or number of the serrations or teeth between the anchor means and the lock plate, or the relative fineness between the serrations of the anchor means and lock plate, and those between the lock plate and the bolt. By the use of the fitting a greater freedom for locating center to center distance between bolt holes on mating structures is permitted and as a result fabricating cost and assembly time are decreased.

The bores in the elements which are being joined do not require special tooling or machining. Greater interchangeability of parts is attained by the use of the fitting. From a weight versus strength standpoint, the fitting of the present invention is much stronger than a turnbuckle fitting or any other type of adjustable fitting used heretofore, for column, bending, tension and tortional loads.

A number of modifications have been described and shown in the appended drawings.

All changes coming within the scope of the appended claims are embraced thereby.

I claim:

1. An adjustable fitting for connecting and adjustably positioning two elements with respect to each other, comprising: a bolt including an axial section and an eccentric section, the eccentric section being adapted to cooperate with a bore in one element; an anchor means provided with a bore and adapted to encircle the bolt, said anchor means being attachable to another element; a lock plate adjustably engageable with the bolt for rotation therewith, the lock plate being axially movable on said bolt; means carried by the lock plate and anchor means for locking the same together against rotation with respect to each other; and nut means cooperating with the bolt for holding the bolt, lock plate and anchor means in locked position.

2. An adjustable fitting for connecting and adjustably positioning two elements with respect to each other, comprising: a bolt including an axial section and an eccentric section, the eccentric section being adapted to cooperate with a bore in one element; an anchor means provided with a bore and adapted to encircle the bolt, said anchor means being engageable with another element; a lock plate adjustably engageable with the bolt for rotation therewith, the lock plate being axially movable on said bolt; a plurality of circumferentially arranged means carried by the lock plate and anchor means for locking the same together in different rotational positions with respect to each other; and nut means for holding the bolt, lock plate and anchor in locked position.

3. An adjustable fitting for connecting and adjustably positioning two elements with respect to each other, comprising: a bolt including an axial section and an eccentric section, the eccentric section being adapted to cooperate with a bore in one element; an anchor means provided with a bore and adapted to encircle the bolt, said anchor means being engageable with another element; a lock plate adjustably engageable with the bolt for rotation therewith, the lock plate being axially movable on said bolt; a plurality of circumferentially arranged means carried by the lock plate and anchor means for locking the same together in different rotational positions with respect to each other; nut means for holding the bolt, lock plate and anchor in locked position; and a connection between the nut and lock plate whereby said nut is rotatable with respect to the lock plate to impart axial movement to the lock plate when the nut is rotated on the bolt.

4. An adjustable fitting for connecting and adjustably positioning two elements with respect to each other, comprising: a bolt including an axial section and an eccentric section, the eccentric section being adapted to cooperate with a bore in one element; an anchor means provided with a bore and adapted to encircle the bolt, said anchor means being connectible with another element to restrict rotation of the anchor means; a lock plate adjustably engageable with the bolt for rotation therewith, the lock plate being axially movable on said bolt; serrations carried by the lock plate and anchor means, said serrations being engageable upon axial movement of the lock plate to prevent rotation of the lock plate and bolt with respect to the anchor means; and nut means cooperating with the bolt for holding the bolt, lock plate and anchor means in locked position.

5. A fitting of the character stated in claim 1 wherein the anchor means is provided with a plurality of radial serrations and the lock plate is provided upon opposite face portions with radial serrations adapted to cooperate with serrations of the anchor means, the serrations on one face being displaced with respect to serrations on the opposite face.

6. A fitting of the character stated in claim 1 wherein the lock plate is selectively engageable with the bolt in a number of partially rotated positions of the lock plate and a plurality of means for locking the lock plate and anchor means together.

7. A fitting of the character stated in claim 2 wherein the anchor means is selectively engageable with said another element in any one of a number of partially rotated positions of the anchor means.

8. A fitting of the character stated in claim 2 wherein the anchor means is selectively engageable with said another element in any one of a number of partially rotated position of the anchor means, the number of said positions or its multiple being different than the number of circumferentially arranged cooperating means carried by the lock plate and anchor means.

9. A fitting of the character stated in claim 4 wherein the anchor means is selectively connectible to said another element in any one of a number of partially rotated positions of the anchor means.

10. A fitting of the character stated in claim 4 wherein the anchor means is selectively connectible to said another element in any one of a number of partially rotated positions of the anchor means, the number of said positions or multiple thereof being different from the number of serrations.

11. An adjustable fitting for connecting and adjustably positioning two elements with respect to each other, comprising: a bolt including an axial section and an eccentric section, the eccentric section being adapted to cooperate with a bore in one element while the axial section cooperates with a bore in another element; a plurality of circumferentially spaced serrations upon the bolt; axially movable means encircling the bolt and carrying serrations for engaging the bolt serrations; and means for locking the last-named means in any one of a number of partially rotated positions upon one of said elements.

12. A fitting of the character stated in claim 11 wherein the number of cooperating serrations differs from the number of partially rotated positions or multiple thereof and in which the axially movable means is selectively locked to one of said elements.

OLAF T. BENDICSEN.

REFERENCES CITED

The following references are of record in the file of this patent:

UNITED STATES PATENTS

| Number | Name | Date |
| --- | --- | --- |
| 861,423 | Ayers | July 30, 1907 |
| 966,666 | Dimler | Aug. 9, 1910 |
| 1,402,463 | Wilson | Jan. 3, 1922 |
| 1,511,677 | Page | Oct. 14, 1924 |
| 2,077,844 | Leighton | Apr. 20, 1937 |
| 2,242,215 | Johnson | May 20, 1941 |
| 2,405,424 | Herreshoff | Aug. 6, 1946 |